(12) United States Patent  (10) Patent No.: US 6,985,274 B2
Kubaink  (45) Date of Patent: Jan. 10, 2006

(54) MODULATABLE REFLECTOR

(75) Inventor: Joachim Kubaink, Bern (CH)

(73) Assignee: Ruag Electronics, (CH)

( * ) Notice: Subject to any disclaimer, the term of this patent is extended or adjusted under 35 U.S.C. 154(b) by 0 days.

(21) Appl. No.: 10/814,977

(22) Filed: Mar. 31, 2004

(65) Prior Publication Data

US 2004/0190117 A1  Sep. 30, 2004

(30) Foreign Application Priority Data

Mar. 31, 2003 (CH) .................................... 0558/03

(51) Int. Cl.
  *G02F 1/03* (2006.01)
  *G02B 6/26* (2006.01)
(52) U.S. Cl. ..................... 359/241; 359/240; 359/238; 359/245; 359/247; 385/16; 385/30
(58) Field of Classification Search ................ 359/241, 359/240, 238, 245, 247, 322, 279; 385/16, 385/30, 31, 32
See application file for complete search history.

(56) References Cited

U.S. PATENT DOCUMENTS 4,143,263 A  3/1979 Eichweber
4,249,264 A  2/1981 Crochet et al.
5,432,123 A  7/1995 Dentai et al. ................. 438/24
2004/0170352 A1 * 9/2004 Summers et al. ............. 385/16

FOREIGN PATENT DOCUMENTS

DE  2453077  5/1976
FR  2438275  4/1980

OTHER PUBLICATIONS

International-Type Search Report, Sep. 2003—English Translation.

* cited by examiner

*Primary Examiner*—Timothy Thompson
(74) *Attorney, Agent, or Firm*—Ostrolenk, Faber, Gerb & Soffen, LLP

(57) ABSTRACT

A radiation reflecting element (34), more particularly a so-called triple prism or a retro-reflector, is provided with a photonic element on a surface serving either for the passage of an electromagnetic energy beam (light) (40,43) or on one of the surfaces (30–32) serving for the deflection of the beam. The photonic element is characterized by the presence of a photonic band gap (5,7) capable of being shifted e.g. by an electric signal. Thus, with an appropriate selection of the wavelength of the light beam, the photonic element can be switched from reflective to transmissive, thereby allowing a modulation of the light beam with a high modulation depth.

9 Claims, 5 Drawing Sheets

MODULATABLE REFLECTOR

FIELD OF THE INVENTION

The present invention refers to a modulatable reflector for electromagnetic radiation energy, specifically light, according to the preamble of claim 1.

In the following description, in place of other forms of electromagnetic radiation energies, reference will be made to light, which is the preferentially contemplated energy form. Other radiation energy forms having similar propagation and reflection properties and that are suitable for being reflected and modulated by the described modulatable reflector are also included on principle.

BACKGROUND OF THE INVENTION

A known form of reflectors for light are prisms and particularly triple prisms which, in ideal conditions, reflect the incident light from any given direction in a parallel beam. Generally, triple prisms consist of a cylindrical body one end of which forms a point of three surfaces disposed at a mutual angle of 90°. In other words, one end of the cylinder is in the form of a triangular pyramid. Light entering the cylinder through the plane surface at the other end thereof is reflected in parallel to the entering beam but in the opposite direction by total reflection on the surfaces of the pyramid. Of course, this reflection process requires that the triple prism consists of a material having a higher refractive index than the environment.

Possible applications of such prisms are e.g. in simulation systems for military training, identification of friend or foe in planes, but also in other applications where the presence of an object is to be detected and the object is to be identified. To achieve a large range, laser beams are used which scan the environment, and a beam reflected by a triple prism is detected by a sensor located near the light source.

An aim of such installations is to detect not only the presence of an object but also its identity. One possibility consists in permanently monitoring the position of each object by means of a supervising control unit. If an object is detected in a given position, the control unit can determine the identity of the object through its knowledge of the positions of all objects. The disadvantage of this approach is that it requires a complete surveillance of all objects by a central unit, thereby creating high demands with respect to the corresponding interlinking and a considerable delay in the detection.

Another possibility is that the reflector modulates the reflected light beam, thereby returning information related to the object equipped with the triple prism to the emitter. The result is a substantial reduction in complexity, a simpler structure of the entire system as the moving objects are autonomous, and a more rapid identification of the located objects.

A reflector of this kind is described in U.S. Pat. No. 4,143,263. According to this reference, an optical switch is disposed in front of the reflector, e.g. a liquid crystal element, a piezoceramic modulator, or a KDP cell (KDP: potassium dihydrogen phosphate). U.S. Pat. No. 4,249,265 suggests a mechanical solution using a shutter in front of the reflector.

However, the mentioned solutions suffer from different disadvantages: they are either expensive, provide a limited modulation depth, or attenuate the light beam.

SUMMARY OF THE INVENTION

It is therefore an object of the invention to provide a different possibility of modulating a light beam reflected by a reflector.

This object is accomplished by a reflector comprising a photonic element having a controllable band gap, which is disposed in the beam path and/or on a surface reflecting the radiation, for modulating the radiation passing through the element. Preferred embodiments and applications of the reflector are indicated in the dependent claims.

Thus, the modulation of a light beam is accomplished by a photonic element having adjustable photonic properties. More particularly, the control is achieved by application of an electric voltage. The photonic element may be disposed directly in the beam path, or it may be optically coupled to the surfaces of the reflector on which the light beam is refracted and/or reflected.

A photonic element is defined as an element having a so-called photonic band gap. A photonic band gap is characterized by the fact that light whose wavelength or energy is located within the band gap cannot propagate in the photonic element. Such light will be reflected by the photonic element while it is transparent for other light. The location of this band gap can be rendered adjustable by suitable measures. One known measure is to embed a nematic and/or ferroelectric liquid crystal material in the photonic element. When an electric voltage is applied, the optical properties of the liquid crystal change and the band gap is simultaneously shifted by a however small frequency difference. Due to the steep flanks of the photonic band gap, it is nevertheless possible in this manner to achieve a complete turning of the photonic crystal, i.e. for incident light whose frequency corresponds to the band gap, more particularly for a laser beam of such a frequency, the properties of the photonic element can be switched from transparent to reflecting.

BRIEF DESCRIPTION OF THE DRAWINGS

The invention shall be explained in more detail hereinafter by means of preferred exemplary embodiments and with reference to figures.

DETAILED DESCRIPTION OF PREFERRED EMBODIMENTS

Figure 1:
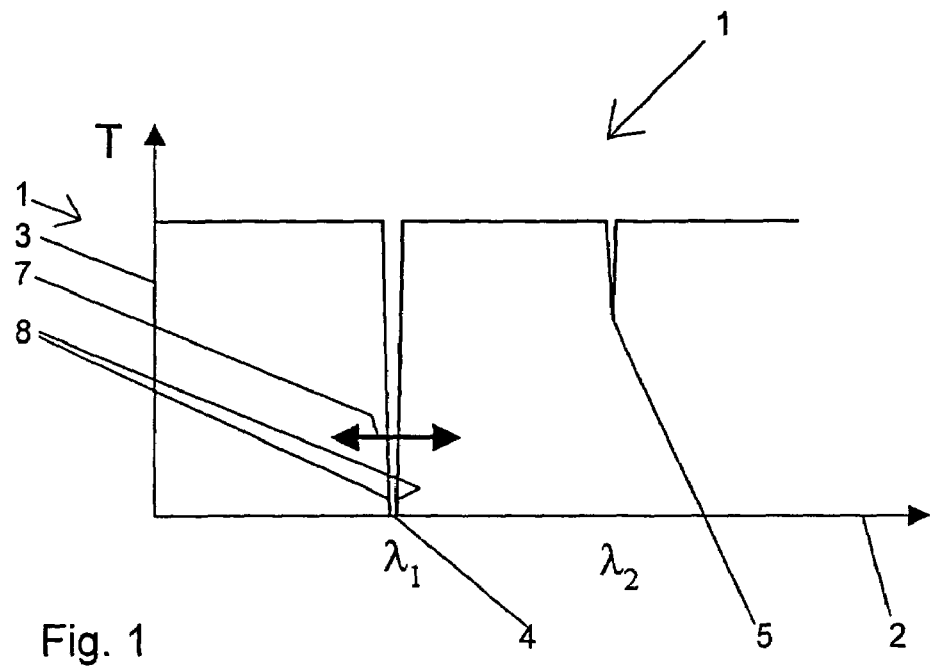
FIG. 1: schematic transmission diagram of a photonic material.

FIG. 1 schematically shows the transmission behavior of a photonic element as it is intended for the implementation of the invention. The wavelength is plotted on the abscissa 2, and on ordinate 3 the transmissivity T for the electromagnetic radiation energy of the respective wavelength λ. It is clearly apparent that in certain locations, namely those of band gaps 4, 5, the transmissivity T is strongly reduced, in the strong band gap 4 almost to opacity, which amounts to a reflection of the incident beam in the case of photonic elements. As indicated by double arrow 7, the location of a band gap, in this case band gap 4, is displaceable. Evidently, the photonic element is thereby toggled from transparency to reflection with respect to radiation of the wavelength $λ_1$. Actually, as the flanks 8 of band gap 4 are very steep, this switch is also achieved even if a shift 7 is only possible within the order of magnitude of the width of band gap 4: it is sufficient to choose the wavelength $λ_1$ such that it is as close as possible to the respective flank 8, so that flank 8 will sweep over the wavelength $λ_1$ when shifted.

The photonic elements of the prior art are composed of regularly arranged zones of different optical density, e.g. of corresponding crystal structures. Originally, only one-dimensional structures of this kind were manufactured, but at present, two-dimensional and three-dimensional photonic structures are also realizable, and particularly the latter two are used in the present invention. The photonic material contains cavities that are filled with a suitable material for influencing the band gap. In the case of a control by electric fields, the use of a nematic or ferroelectric liquid crystal for this purpose is known in the art. Experiments have shown that in this manner, a shift of the band gap by $10^2$ Hz, possibly even up to $10^6$ Hz is possible. The modulation frequency may reach several hundred KHz.

Furthermore, the intended function requires light of a precisely defined wavelength. Corresponding light sources are available today in the form of laser light sources. More particularly, laser scanners are routinely used in the simulation of the impact of weapons in combat training.

Figure 2:
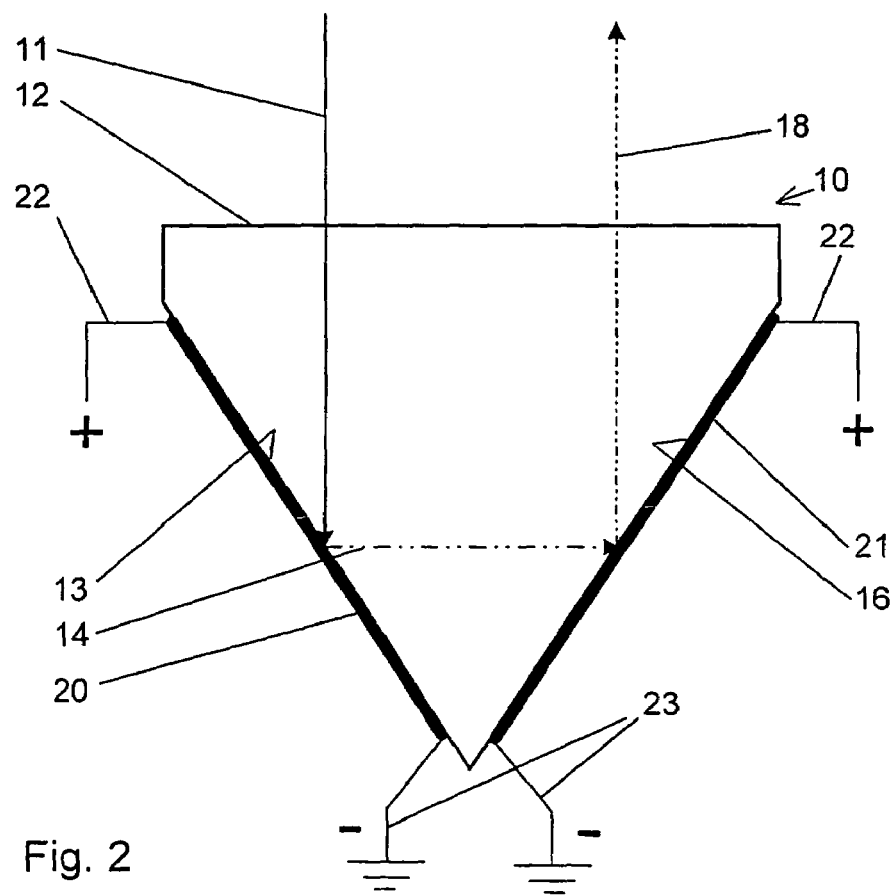
FIG. 2: sectional view of a primitive prism.

FIG. 2 shows a cross-section of a basic prism 10. A light beam 11 enters prism 10 e.g. essentially perpendicularly to surface 12, is orthogonally deflected on first inclined surface 13 (beam 14) and again deflected by 90° on second prism surface 16 into a direction parallel to incident light beam 11. Subsequently, it exits prism 10 in the form of back-reflected light beam 18.

According to the invention, in this example, the prism surfaces 13, 16 are provided with a photonic material as indicated here by thick lines 20, 21. Since the photonic material is switchable between reflective and transparent for electromagnetic radiation (in this case specifically light), besides total reflection (phase transition from high optical density to low optical density), it is also possible to directly utilize the mirror effect to achieve a reflection. In this case, prism 10 would e.g. essentially consist of photonic surfaces 20, 21 only, i.e. constitute an air prism, so to speak. However, to protect the photonic elements 20, 21, the prism is preferably closed in this case as well, e.g. by a transparent lid 12.

Schematically indicated are the terminals 22 (+) and 23 (−) for the control of photonic elements 20, 21. The latter may be controlled by appliances of the type known from the field of liquid crystal displays. A detailed discussion is therefore omitted.

Figure 9:
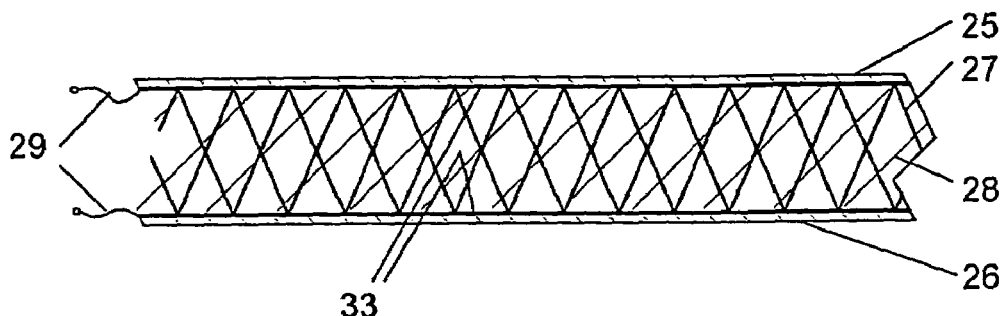
FIG. 9: partial section through the coupling of a photonic element to an air prism.

FIG. 9 shows a cross-section of a photonic element suitable for this purpose. The photonic material is enclosed between an upper cover 25 and a lower cover 26. It is composed of the photonic material 27 itself and the embedded liquid crystal 28 symbolized by the hatching. The upper and lower covers 25, 26 are e.g. of glass. The interior of the hollow or air prism is situated above upper cover 25.

Lines 29 supply the necessary voltages to electrodes 33 located between covers 25, 26 and the photonic material 27. The voltage for controlling liquid crystal 28 and thereby shifting the photonic gap is applied to electrodes 33 by terminals 29. The control technique as well as the realization of electrodes 33 may e.g. be taken from liquid crystal display technology. A detailed discussion may therefore be omitted.

Figure 10:
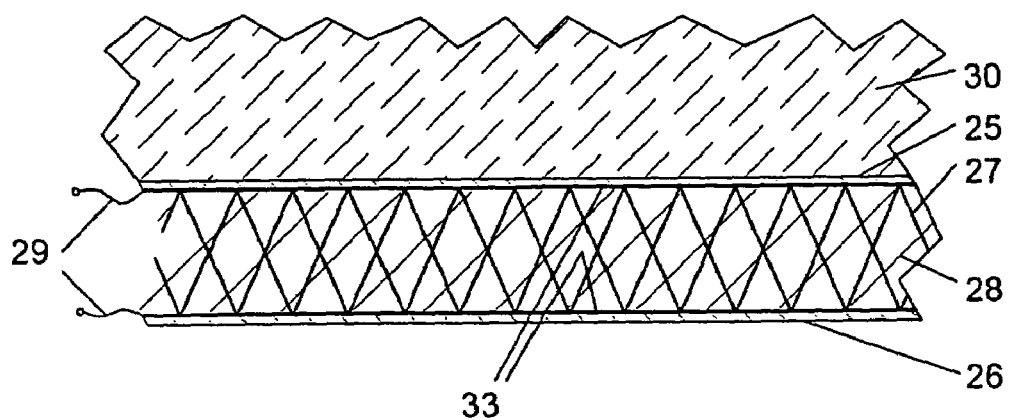
FIG. 10: partial section through the coupling of a photonic element to a massive prism covered on both sides.

FIG. 10 essentially shows the same photonic element as FIG. 9. In this case, however, it is a massive prism 30. In this embodiment it is important that a total reflection on the phase boundary between prism 30 and upper cover 25 is excluded in the widest possible angular range as the photonic element 27, 28 is otherwise ineffective.

Figure 11:
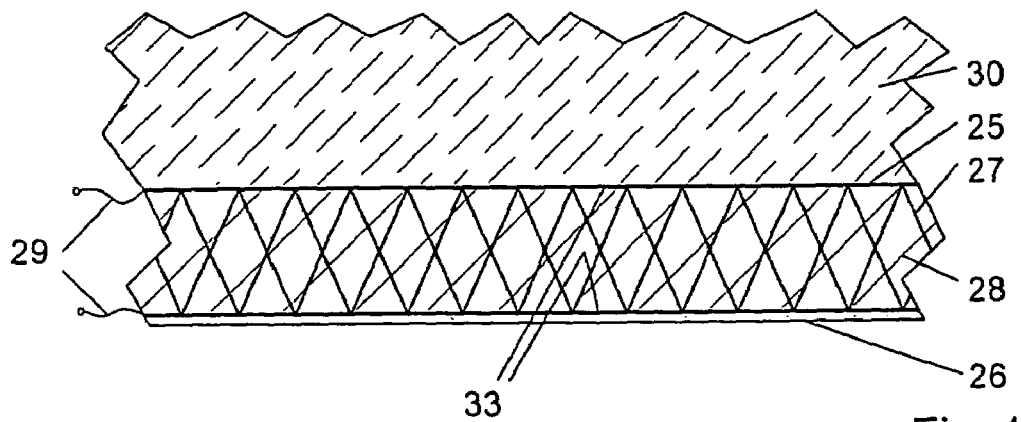
FIG. 11: partial section through the coupling of a photonic element to a massive prism covered on one side.

According to FIG. 11, prism 30 itself may alternatively serve as upper cover 25. In this case, prism 30 is in direct contact with photonic material 27, 28.

The use of photonic elements for modulating the light beam reflected by a triple prism is possible by the arrangement of the photonic element or elements on different locations of the triple prism or retro-reflector.

For influencing the liquid crystal, an electric voltage is applied in a manner known per se, e.g. by electrodes of a transparent design which are not shown in the figures as they are known to those skilled in the art, and they may be of different constructions depending on the application.

Figure 3:
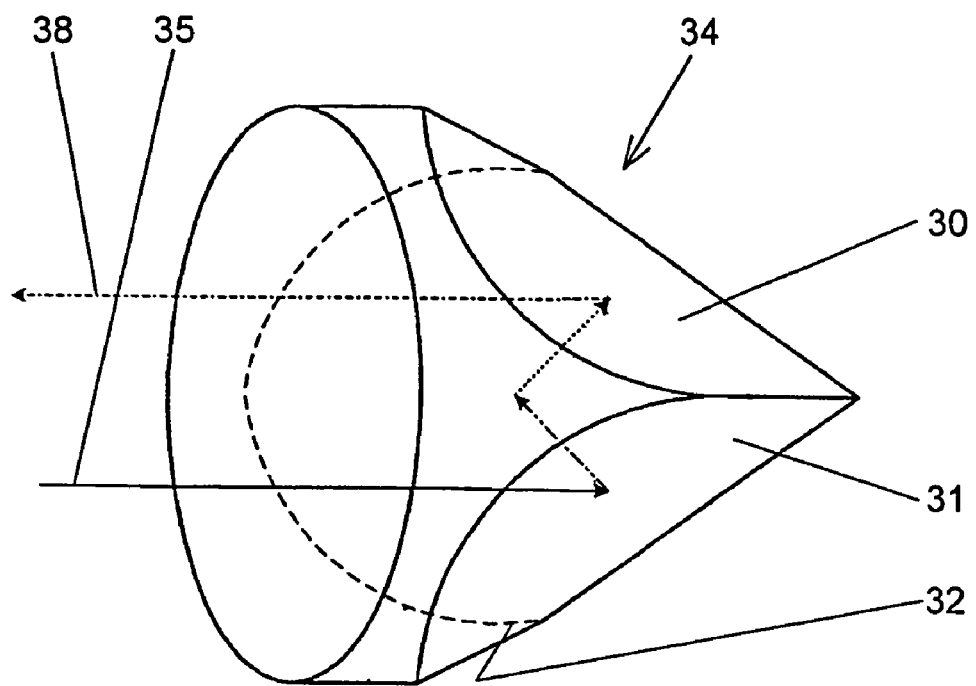
FIG. 3: side view of a triple prism according to the invention with photonic element disposed on reflecting surfaces.
Figure 4:
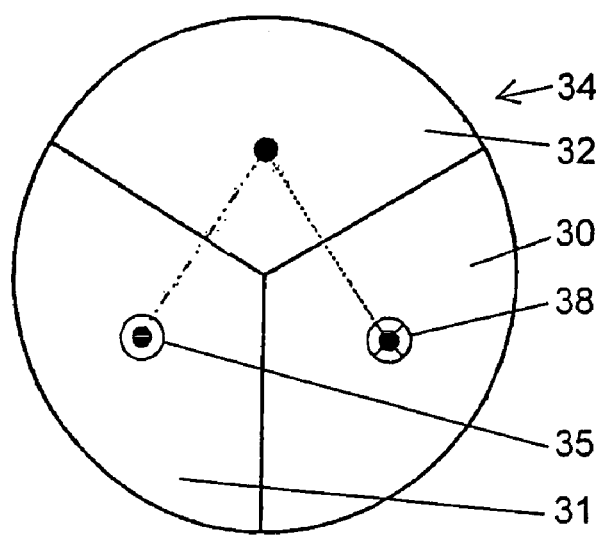
FIG. 4: bottom view of the triple prism of FIG. 3.

FIGS. 3 and 4 show a first implementation where the photonic elements 30, 31, 32 constitute also the reflecting surfaces of triple prism 34. To simplify the figure, they are not identified here in particular. Surfaces 30 through 32 may be completely or preponderantly constituted or covered by the photonic element. Since the light beam is almost always reflected by all of the three surfaces, it is basically possible to provide a photonic element on two or even only one of the surfaces instead of all three surfaces 30 to 32.

Incident light beam 35 reaches the first reflecting surface 31 and is modulated by the photonic element, if present, for the first time. It is reflected toward the second surface 32, where possibly a second modulation takes place. From there, it is reflected toward third surface 30, from which it exits antiparallelly to incident beam 35 in the form of beam 38. Thus, in this embodiment, a maximum of three modulating possibilities is available, thereby allowing up to three superimposed modulations of light beam 38.

Figure 5:
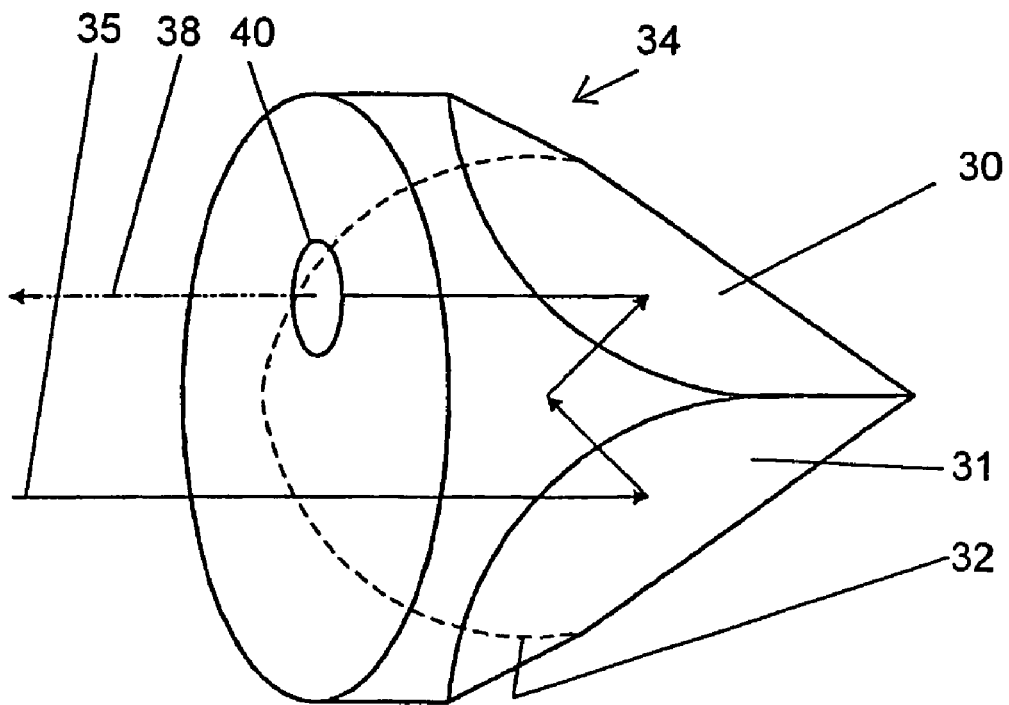
FIG. 5: oblique view of a triple prism of the invention with photonic element in beam exit.
Figure 6:
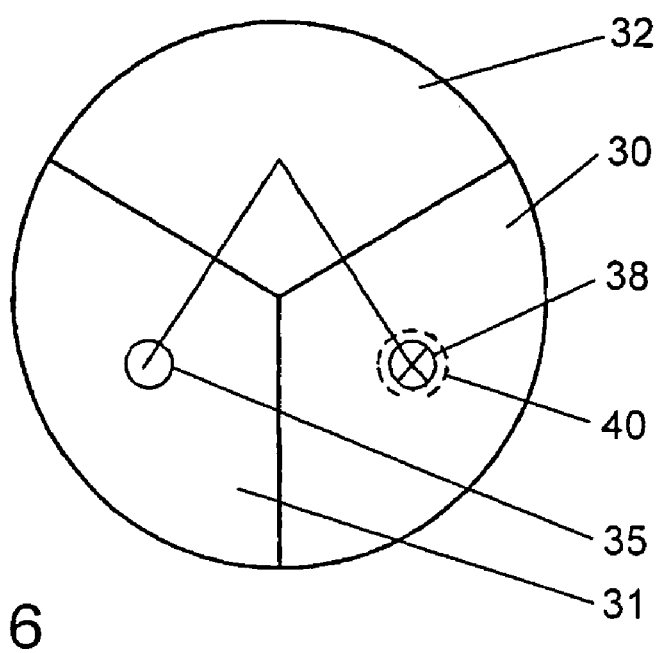
FIG. 6: bottom view of the triple prism of FIG. 5.

FIGS. 5 and 6 show a different variant where a photonic element 40 is arranged such that it is crossed by the exiting beam 38 only during the exit of the latter from prism 34. In these two figures, as well as in the following FIGS. 7 and 8, reference numerals corresponding to those in FIGS. 3 and 4 have the same meaning.

Figure 7:
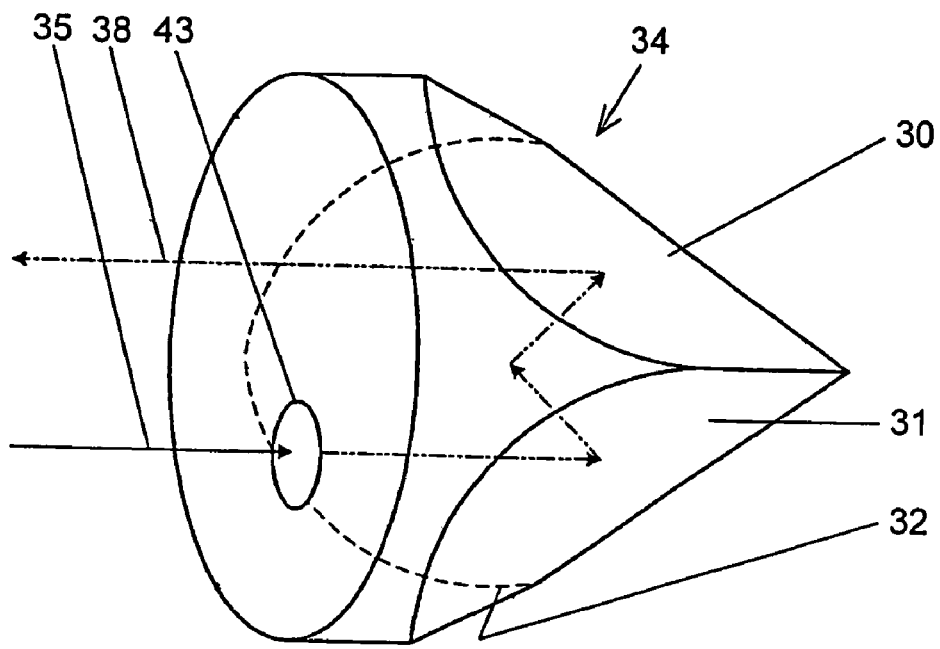
FIG. 7: oblique view of a triple prism of the invention with photonic element in beam entrance.
Figure 8:
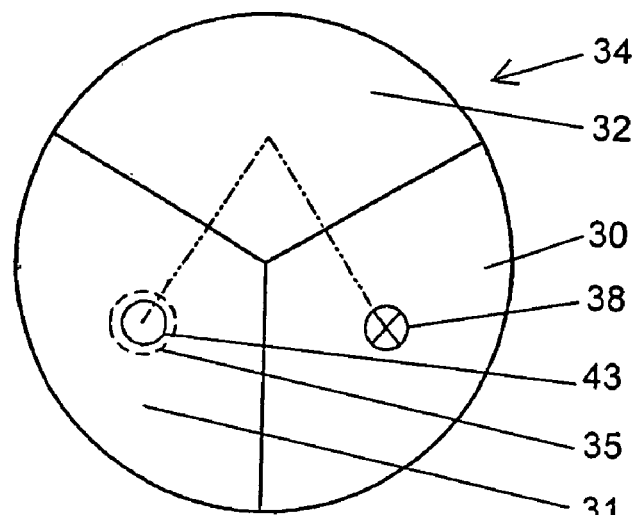
FIG. 8: bottom view of the triple prism of FIG. 7.

FIGS. 7 and 8 show the alternative arrangement of FIGS. 5 and 6: here, the photonic element is arranged such that beam 35 passes photonic element 43 and is possibly modulated on its entry into prism 34.

From the description of the preferred exemplary embodiments, a large number of modifications are accessible to those skilled in the art without leaving the scope of protection of the invention as defined by the claims. Thus, for example, the following variations may be thought of:

The possible dispositions of the photonic elements on the reflecting surfaces and in the incident and/or exiting beam, may be combined with each other as desired, either to achieve an additional amplification of the modulation effect by parallel operation or to simultaneously apply up to five different modulations to a light beam.

The orientation of the triple prism with respect to the light source is indicated by the arrangement of photonic elements on the end surface of the triple prism.

The cross-section of the triple prism is other than circular, more particularly polygonal.

The reflecting surfaces of the triple prism are curved instead of plane.

Applications in non-interruptable reflection light barriers by modulation of the light beam in the reflectors.

Applications in precision length measurement, data transmission.

What is claimed is:

1. An element reflecting electromagnetic radiation, specifically light, wherein said element comprises a photonic element having a controllable band gap, the photonic element being disposed in the beam path of and/or on a surface reflecting said radiation, for modulating the radiation passing through said element, wherein said element is essentially a prism and in particular a triple prism, and said photonic element is provided on at least one, preferably all prism surfaces intended for reflecting said radiation.

2. The radiation reflecting element of claim 1, wherein said photonic element is controllable by means of electric signals.

3. The radiation reflecting element of claim 2, wherein said photonic element is essentially composed of a photonic material in a liquid crystal environment, such that a photonic band gap of said photonic material is capable of being influenced by influencing the liquid crystal material in the nematic and/or ferroelectric state by an electric field.

4. An element reflecting electromagnetic radiation, specifically light, wherein said element comprises a photonic element having a controllable band gap, the photonic element being disposed in the beam path of and/or on a surface reflecting said radiation, for modulating the radiation passing through said element, wherein said reflecting element is a prism, preferably a triple prism, and said photonic element is disposed on the surface serving for the entrance and the exit of a beam of the radiation.

5. An object identification system comprising a laser of a determined wavelength for producing an electromagnetic beam, specifically a light beam, and at least one element reflecting electromagnetic radiation, specifically light, wherein each of said at least one element comprises a photonic element having a controllable band gap, the photonic element being disposed in the beam path of and/or on a surface reflecting said radiation, for modulating the radiation passing through said element, said at least one element being provided on an object, wherein at least one, preferably all photonic elements of said at least one radiation reflecting element are chosen such that the reflective properties of the at least one radiation reflecting element are adjustable by controlling the photonic element or elements, more particularly switchable from high reflectivity to low reflectivity, for modulating the reflected light beam with data.

6. A method of modulating a beam of electromagnetic radiation, more specifically of a light beam, using an element reflecting electromagnetic radiation, specifically light, wherein said element comprises a photonic element having a controllable band gap, the photonic element being disposed in the beam path of and/or on a surface reflecting said radiation, for modulating the radiation passing through said element, said element transmitting data, said beam comprising a component of a wavelength for which said radiation reflecting element is switchable, by influencing at least a portion of the photonic element thereof, between two states of higher and lower transparency and/or reflectivity.

7. The method of claim 6, wherein said beam is essentially composed of radiation of the wavelength that can be influenced.

8. The radiation reflecting element of claim 4, wherein said photonic element is controllable by means of a electric signals.

9. The radiation reflecting element of claim 8, wherein said photonic element is essentially composed of a photonic material in a liquid crystal environment, such that a photonic band gap of said photonic material is capable of being influenced by influencing the liquid crystal material in the nematic and/or ferroelectric state by an electric field.

* * * * *